(12) United States Patent
Lin

(10) Patent No.: US 8,689,629 B2
(45) Date of Patent: Apr. 8, 2014

(54) SENSING UNIT FOR BICYCLE SPEEDOMETER

(75) Inventor: Wen-Hwa Lin, Taichung (TW)

(73) Assignee: VP Components Co., Ltd., Taichung (TW)

( * ) Notice: Subject to any disclaimer, the term of this patent is extended or adjusted under 35 U.S.C. 154(b) by 305 days.

(21) Appl. No.: 13/227,839

(22) Filed: Sep. 8, 2011

(65) Prior Publication Data

US 2013/0061676 A1    Mar. 14, 2013

(51) Int. Cl.
*G01P 15/00* (2006.01)
*G01P 1/02* (2006.01)

(52) U.S. Cl.
USPC .............................................. 73/489; 73/494

(58) Field of Classification Search
USPC ................... 73/489, 491, 494, 495, 498, 499
See application file for complete search history.

(56) References Cited

U.S. PATENT DOCUMENTS

| | | | | |
|---|---|---|---|---|
| 4,071,892 A * | 1/1978 | Genzling | ...................... | 701/527 |
| 4,526,036 A * | 7/1985 | Morrison | ....................... | 73/493 |
| 4,633,216 A * | 12/1986 | Tsuyama | ...................... | 340/432 |
| 5,511,435 A * | 4/1996 | Kitamura et al. | ............ | 73/865.9 |
| 6,597,166 B2 * | 7/2003 | Meggiolan | .................... | 324/174 |
| 6,779,401 B2 * | 8/2004 | Montagnon | ..................... | 73/489 |
| 7,062,969 B2 * | 6/2006 | Ueda | ............... | 73/493 |
| 7,408,447 B2 * | 8/2008 | Watson | ........................ | 340/432 |
| 2008/0111668 A1 * | 5/2008 | Ueda | ............. | 340/432 |
| 2009/0088934 A1 * | 4/2009 | Takebayashi | ................... | 701/51 |
| 2009/0119032 A1 * | 5/2009 | Meyer | .............................. | 702/44 |
| 2009/0120210 A1 * | 5/2009 | Phillips et al. | ........... | 73/862.338 |
| 2010/0263468 A1 * | 10/2010 | Fisher et al. | .................... | 74/469 |

* cited by examiner

*Primary Examiner* — Helen Kwok
(74) *Attorney, Agent, or Firm* — WPAT, P.C.; Anthony King

(57) ABSTRACT

A sensing unit for a bicycle speedometer is disclosed. The bicycle speedometer has a meter body and the sensing unit for detecting pedaling and generating a signal related to bicycle pedaling. The sensing unit includes a sensor mounted on a bicycle frame and a fixture for carrying a sensed member. The fixture has a fixing end coupled with a bicycle crank and a coupling arm for carrying the sensed member. The fixture allows positional adjustment of the sensed member with respect to the bicycle crank, thereby facilitating aligning the sensed member with the sensor, so as to ensure proper sensing of the sensor to the sensed member.

8 Claims, 7 Drawing Sheets

SENSING UNIT FOR BICYCLE SPEEDOMETER

BACKGROUND OF THE INVENTION

1. Technical Field

The present invention relates to bicycle speedometers, and more particularly, to a sensing unit for a bicycle speedometer, wherein the sensing unit has a positionally adjustable sensed member and therefore able to be aligned with a sensor of the sensing unit, so as to ensure the bicycle speedometer with a reliable signal related to bicycle pedaling.

2. Description of Related Art

With people's increasing awareness of the importance of environmental protection and individual health, cycling for both transportation and exercise has become a fashion. In this context, various accessories and tools are vigorously developed for the purpose of facilitating riding. A conventional bicycle speedometer typically includes a meter body for providing information and a sensing unit for detecting pedaling and generating a signal related to bicycle pedaling, so that the signal generated by the sensing unit can be processed into information about pedaling counts, frequency and/or speed of pedaling, and displayed through the meter body for the relevant cyclist to read as reference in terms of calorie consumption and so on.

Taiwan Utility Model Patent No. M386237 has disclosed a device for detecting pedaling frequency. The device is composed of a magnetic sensor fixed to a bicycle's bottom bracket and a turning table that carries thereon more than one magnetic member and is configured to rotate with the bicycle's crank, so the turning table facing the magnetic sensor can have the magnetic members alternately sensed by the magnetic sensor while the bicycle is pedaled and the crank is rotating. Thereby, the magnetic sensor generates a signal about the magnetic members that pass by, and the signal can be used to produce the data of pedaling frequency.

However, this prior-art detecting approach works on condition that the magnetic field generated by the magnetic members appropriately overlaps the sensing range of the magnetic sensor. Otherwise, the insufficient magnetic intensity would lead to sensing mistake. In addition, for different types of bicycle frames, the magnetic sensor fixed to the bicycle's bottom bracket has to be redesigned in terms of both size and position opposite to one that can readily fit all kinds of bicycles and be promotive to end-users' DIY installation.

SUMMARY OF THE INVENTION

In view of the shortcomings of the prior art, the present invention provides a sensing unit for a bicycle speedometer. The sensing unit of the bicycle speedometer is such designed that, when installed, the relative position and relative distance between its sensing components are adjustable, so that the disclosed sensing unit fits various bicycles and ensures accurate sensing of a signal related to bicycle pedaling.

According to the present invention, a bicycle speedometer comprises a meter body for displaying information and a sensing unit for detecting pedaling and generating a signal related to bicycle pedaling as a source of the information, and the sensing unit comprises:

a sensor installed onto a bicycle frame; and a fixture, having a fixing end coupled to a bicycle crank and an opposite end extended with a coupling arm, wherein the fixing end is fixed to the bicycle crank through a screw engaged with a threaded hole formed on the bicycle crank and the coupling arm holds a sensed member.

One objective of the present invention is that by changing the relative angle between the fixture and the bicycle crank, the relative distance between the coupling arm of the fixture and the bicycle crank can be varied, so that the sensed member can be aligned with the sensor for accurate sensing, thereby ensuring the bicycle speedometer with a reliable signal related to bicycle pedaling.

Another objective of the present invention is that the threaded hole has an inner segment facing the bicycle frame and an outer segment opposite to the inner segment. The outer segment is configured to receive a pedal while the inner segment is configured to receive the screw, so the sensed member can be fixed to the bicycle crank without the need of changing the bicycle crank in structure.

Yet another objective of the present invention is that the coupling arm is axially formed with a fixing hole for adjustably fixing the sensed member so that a distance between the sensed member and the sensor can be adjusted to ensure the sensor's appropriately sensing the sensed member.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

Figure 1:
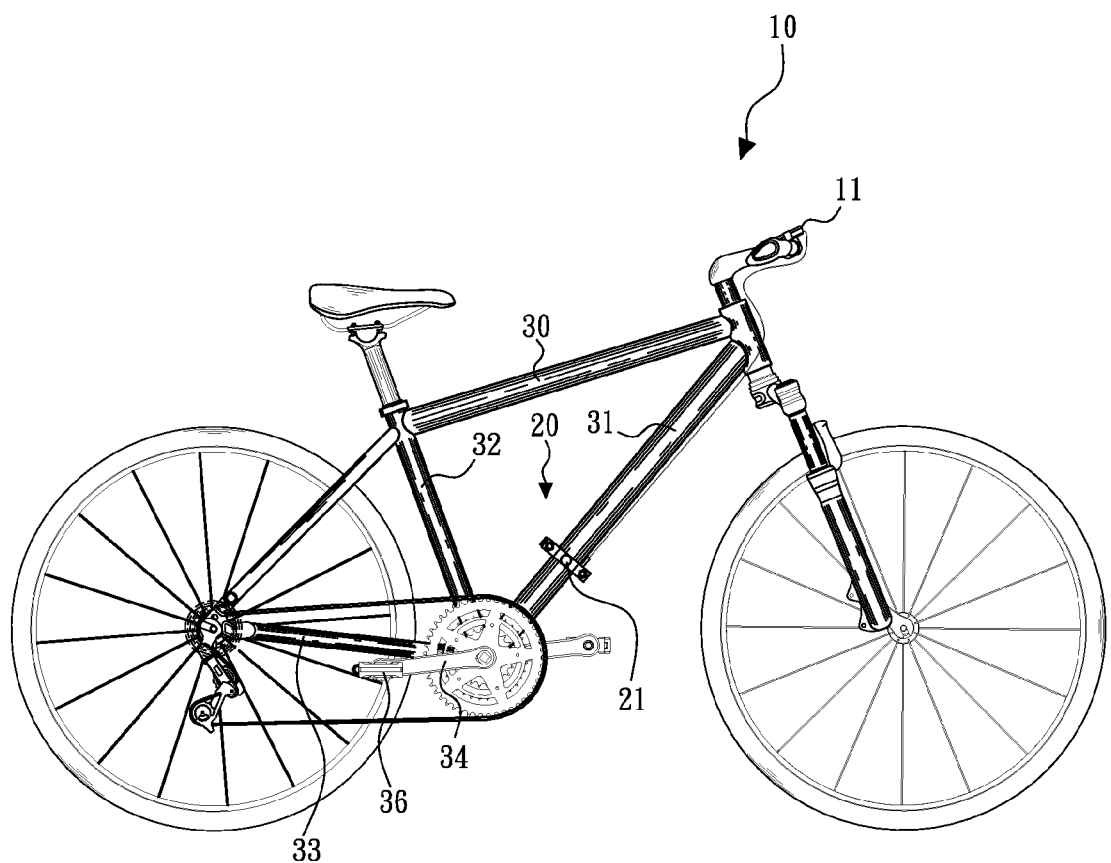
FIG. 1 is a schematic drawing showing a bicycle speedometer with a sensing unit according to the present invention applied to a bicycle.
Figure 2:
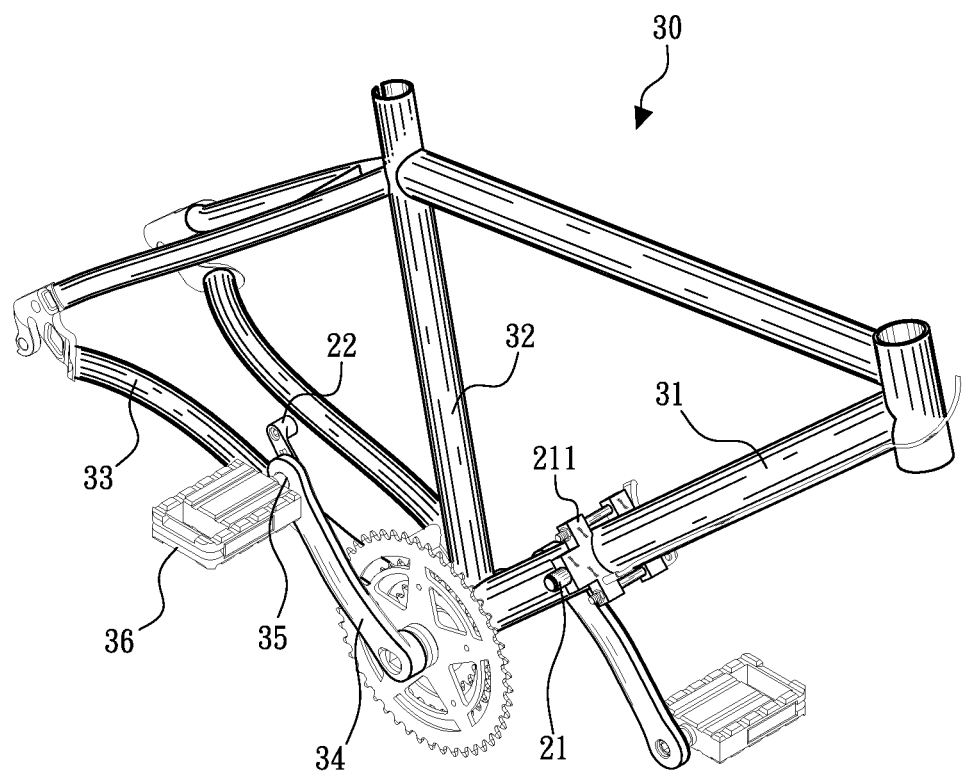
FIG. 2 illustrates the assembled sensing unit of the present invention.

Referring to FIG. 1 through FIG. 4, according to the present invention, a sensing unit for a bicycle speedometer is illustrated. The bicycle speedometer 10 includes a meter body 11 for displaying information and the sensing unit 20 for detecting pedaling and generating a signal related to bicycle pedaling. The sensing unit 20 comprises a sensor 21 installed onto a bicycle frame 30 and a fixture 22 coupled to a bicycle crank 34 for holding a sensed member 23.

The sensor 21 may be a magnetic sensor that is installed in a bracket 211 that is mounted on a down tube 31, seat tube 32 or chain stay 33 of the bicycle frame 30. The sensor 21 is in signal connection with the meter body 11.

The fixture 22 includes a fixing end 221 connecting the bicycle crank 34 and includes an end opposite to the fixing end 221 having a coupling arm 222 extending toward the bicycle crank 34. The fixing end 221 is coupled with the bicycle crank 34 when a screw 223 passing through the fixing end 221 is engaged with a threaded hole 35 formed on the bicycle crank 34. The threaded hole 35 has an inner segment 351 facing the bicycle frame 30 and an outer segment 352 opposite to the inner segment 351. The outer segment 352 is configured to hold a pedal 36, while the inner segment 351 is configured to receive the screw 223 for holding the fixture 22. In addition, the sensed member 23 assembled to the coupling arm 222 is a magnetic component to be sensed by the sensor 21. The coupling arm 222 is axially formed with a fixing hole 224 so that the sensed member 23 can be fixed to the fixing hole 224 in a screwing manner.

Given the foregoing configuration, the present invention is to be further illustrated in terms of operation.

Figure 3:
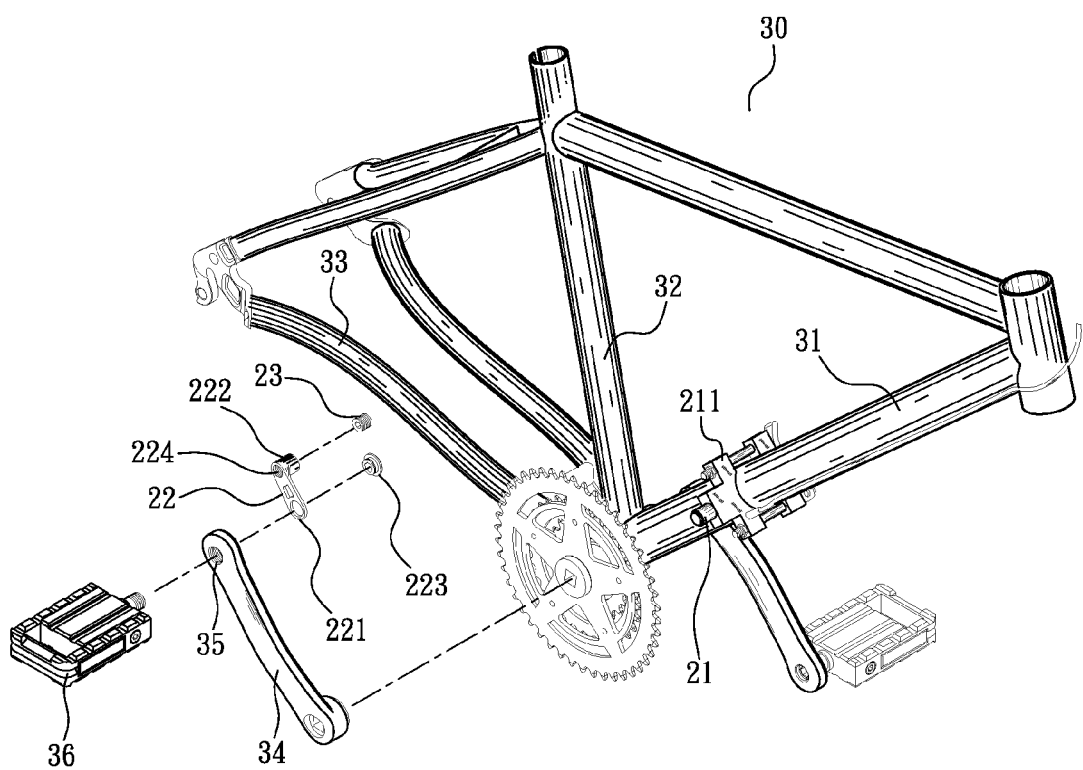
FIG. 3 shows the sensing unit of the present invention exploded.
Figure 4:
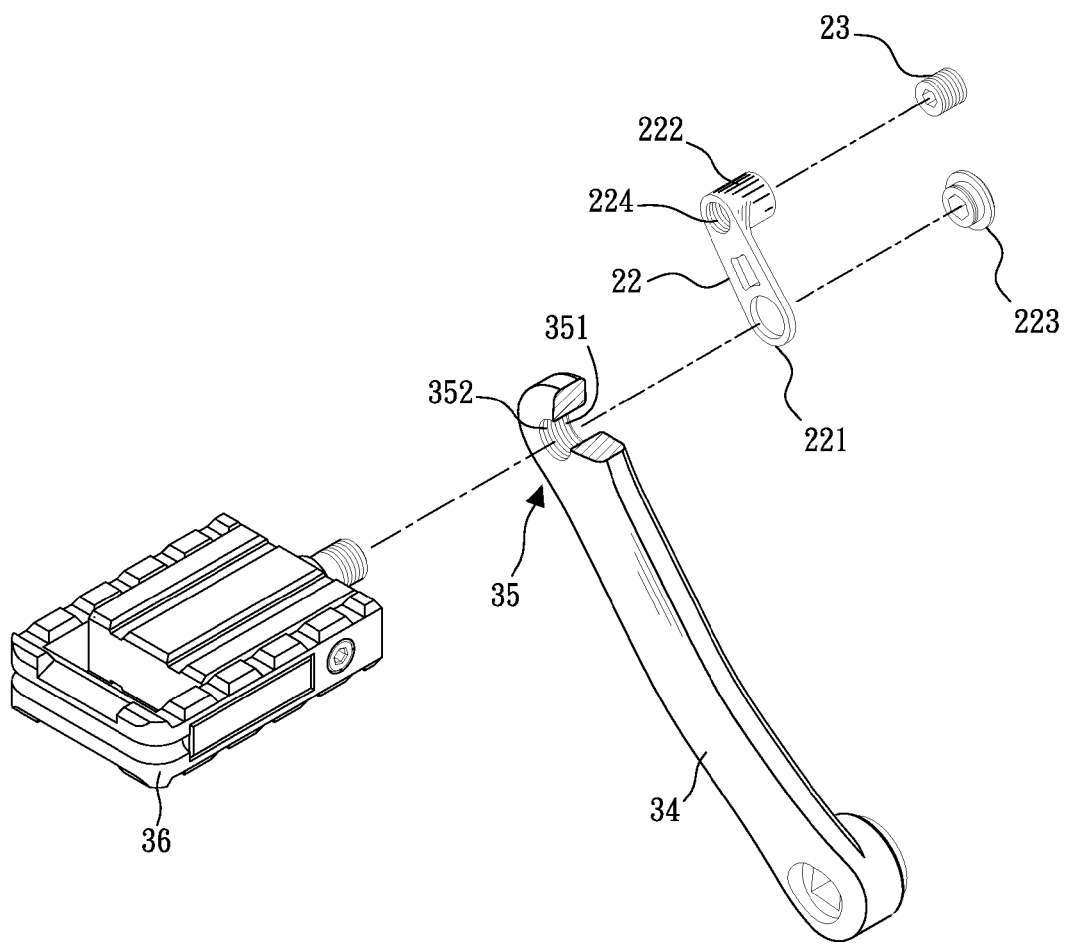
FIG. 4 depicts a cutaway view of the sensing unit of the present invention.

Referring to FIG. 3 and FIG. 4, according to the present invention, the threaded hole 35 of the bicycle crank 34 is divided into the inner segment 351 and the outer segment 352 for connecting the pedal 36 and the screw 223, respectively. Thus, without changing the conventional structure of the bicycle crank 34, the sensed member 23 can be firmly coupled to the bicycle crank 34 through end-users' easy installation and the disclosed device is adaptive to all types of bicycles.

Figure 5:
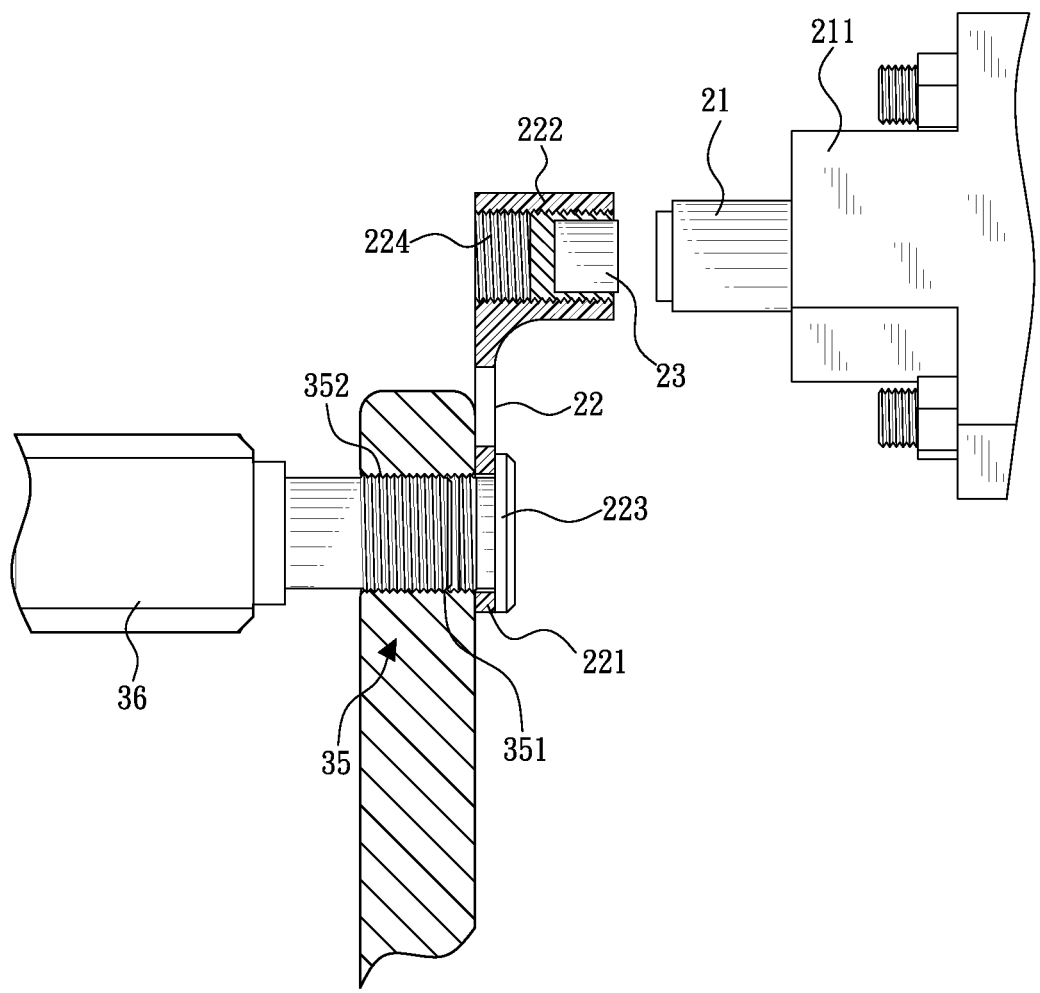
FIG. 5 is a cross-sectional view of the sensing unit of the present invention assembled to the bicycle.

Different types of bicycles usually have their frames and cranks made in different dimensions. This tends to cause poor sensing performance of the sensor and the sensed member installed thereon in the conventional cases. On the other hand, as shown in FIG. 5, the fixture 22 allows the relative position between the sensor 21 and the sensed member 23. Since the fixture 22 is coupled to the bicycle crank 34 by means of the screw 223, when the screw 223 is partially unscrewed from the bicycle crank 34, the coupling arm 222 of the fixture 22 can rotate against the screw 223, or the threaded hole 35, so that a position of the sensed member 23 at the end of the coupling arm 222 with respect to the bicycle crank 34 can vary to make the sensed member 23 properly sensed by the sensor 21. Afterward, when the screw 223 is screwed again, the fixture 22 and, in turn, the sensed member 23 are fixed with respect to the bicycle crank 34 and therefore a trajectory of the sensed member 23 moving with the rotating bicycle crank 34 is changed. Thereby, the rotating bicycle crank 34 driven by a cyclist can bring the sensed member 23 to pass by the sensor 21 for its proper sensing, so as to generate a signal related to bicycle pedaling for the meter body 11.

Figure 6:
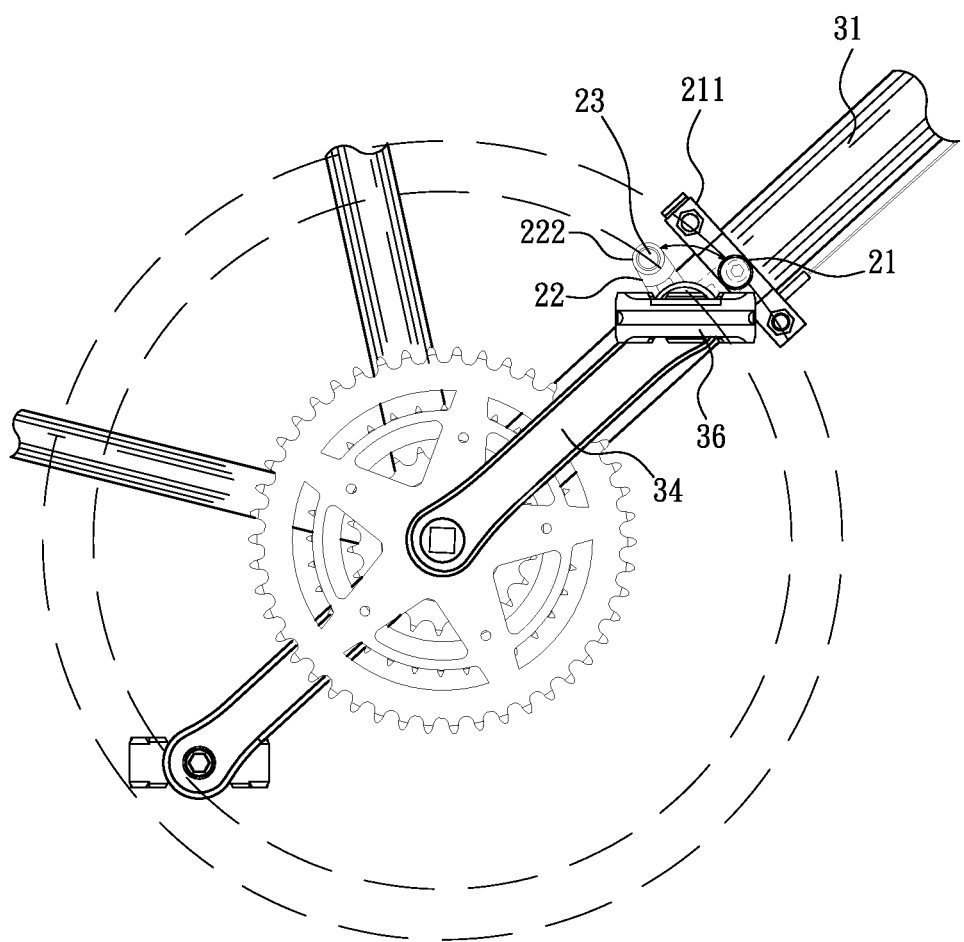
FIGS. 6 and 7 illustrate the operation of the sensing unit of the present invention.
Figure 7:
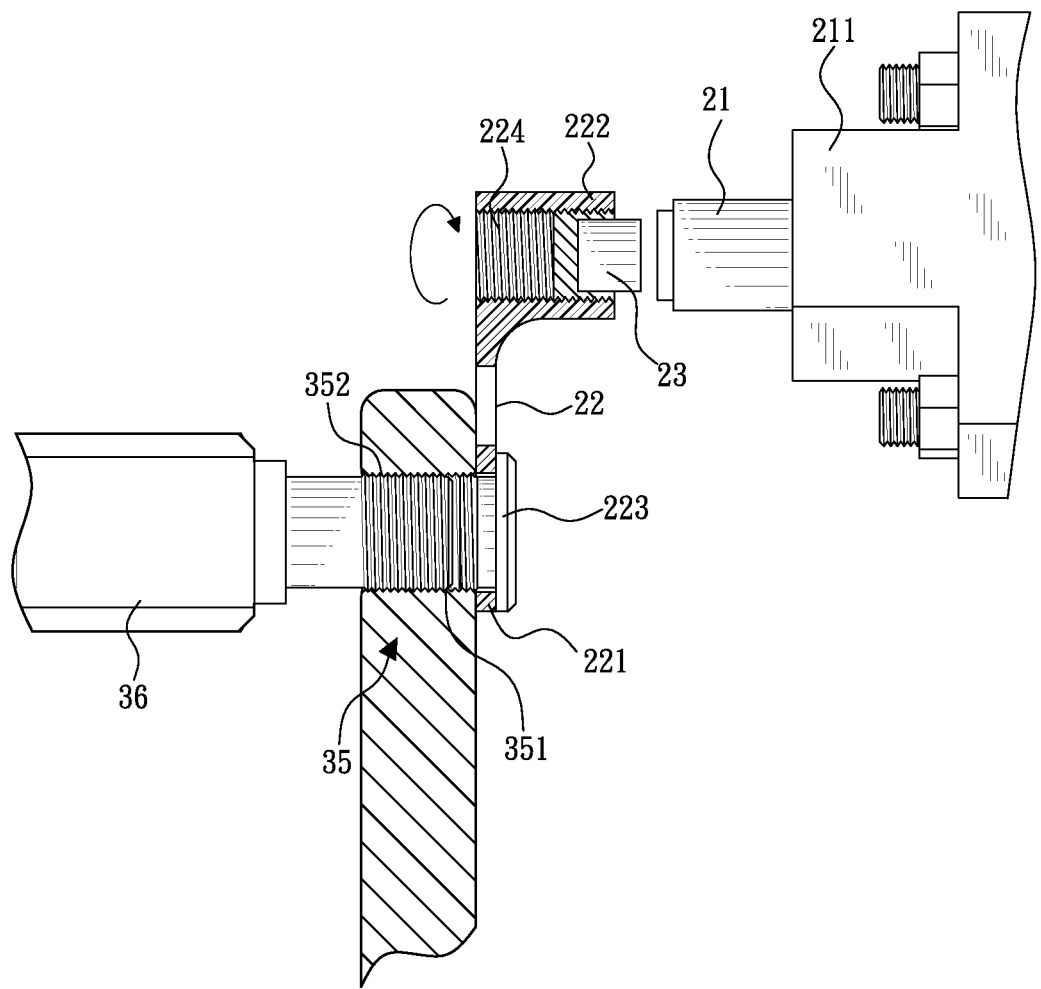

Referring to FIG. 6, apart from the feature that the sensed member 23 can be rotated with respect to the bicycle crank 34, the present invention, for ensuring the sensor 21 and the sensed member 23 being properly separated from each other despite the different distance between the bicycle crank 34 and the bicycle frame 30 in different types of bicycles, has the sensed member 23 assembled to the fixing hole 224 in a screwing manner so that by screwing the sensed member 23 into the fixing hole 224 or unscrewing the sensed member 23 from the fixing hole 224, the sensed member 23 can become further or closer to the sensor 21, thereby preventing the two components from being too far to achieve competent sensing or being too close and colliding. Thereby, the proper sensing of the sensor 21 to the sensed member 23 is secured.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An sensing unit for a bicycle speedometer, the bicycle speedometer having a meter body for displaying information and the sensing unit for detecting pedaling and generating a signal related to bicycle pedaling as a source of the information, and the sensing unit comprising:
    a sensor being installed onto a bicycle frame; and
    a fixture for carrying a sensed member, wherein the fixture has a fixing end coupled with a bicycle crank and an opposite end extended with a coupling arm in parallel with the bicycle crank, in which the fixing end is coupled with one end of the bicycle crank through a screw, and the coupling arm carries the sensed member that is to be sensed by the sensor,
    wherein by rotating the fixture against the bicycle crank with the screw as the axle center of rotation, a trajectory of the sensed member moving with the rotating bicycle crank is adjustable, so that the sensed member is allowed to be aligned with the sensor for the sensor to properly sense the sensed member and generate the signal related to bicycle pedaling for the meter body to display.

2. The sensing unit of claim 1, wherein the end of the bicycle crank is formed with a threaded hole for receiving the screw.

3. The sensing unit of claim 2, wherein the threaded hole includes an inner segment facing the bicycle frame and an outer segment opposite to the inner segment, in which the outer segment is configured to hold a pedal while the inner segment is configured to engage with the screw.

4. The sensing unit of claim 1, wherein the coupling arm is axially formed with a fixing hole for the sensed member to be installed therein.

5. The sensing unit of claim 4, wherein the sensed member is assembled to the fixing hole in a screwing manner.

6. The sensing unit of claim 1, wherein the sensed member is a magnetic component.

7. The sensing unit of claim 6, wherein the sensor is a magnetic sensor.

8. The sensing unit of claim 1, wherein the sensor is installed in a bracket that is mounted on the bicycle frame.

* * * * *